US006658889B2

(12) United States Patent
Krylov

(10) Patent No.: US 6,658,889 B2
(45) Date of Patent: Dec. 9, 2003

(54) APPARATUS FOR PRODUCING POTABLE WATER AND SLUSH FROM SEA WATER OR BRINE

(75) Inventor: Gennady Krylov, Cambridge (CA)

(73) Assignee: 3L Filters Ltd., Cambridge (CA)

(*) Notice: Subject to any disclaimer, the term of this patent is extended or adjusted under 35 U.S.C. 154(b) by 5 days.

(21) Appl. No.: 10/174,985

(22) Filed: Jun. 20, 2002

(65) Prior Publication Data

US 2002/0194865 A1 Dec. 26, 2002

Related U.S. Application Data

(60) Provisional application No. 60/299,159, filed on Jun. 20, 2001.

(51) Int. Cl.[7] .......... C02F 1/44
(52) U.S. Cl. .......... 62/544
(58) Field of Search .......... 62/66, 354, 544

(56) References Cited

U.S. PATENT DOCUMENTS

| | | | |
|---|---|---|---|
| 3,004,395 | A | 10/1961 | Morris |
| 3,044,277 | A | 7/1962 | Barnum |
| 3,328,972 | A | 7/1967 | Svanoe |
| 3,347,058 | A | 10/1967 | Svanoe |
| 3,359,748 | A | 12/1967 | Booth |
| 3,822,566 | A | 7/1974 | Lowi |
| 4,551,159 | A | 11/1985 | Goldstein |
| 4,796,441 | A | 1/1989 | Goldstein |
| 4,912,935 | A | 4/1990 | Goldstein |
| 4,936,102 | A | 6/1990 | Goldstein |
| 4,956,980 | A | 9/1990 | Carvel |
| 5,228,503 | A | 7/1993 | Smith |
| 5,927,099 | A | 7/1999 | Bosko |

FOREIGN PATENT DOCUMENTS

| | | |
|---|---|---|
| CA | 1127550 | 7/1982 |
| CA | 1208027 | 7/1986 |
| CA | 1276475 | 11/1990 |
| CA | 2159652 | 4/1997 |
| DE | 31 31 770 | 6/1982 |
| EP | 0 053 586 | 6/1982 |
| JP | 11030456 | 4/1997 |

*Primary Examiner*—William C. Doerrler
*Assistant Examiner*—Malik N. Drake
(74) *Attorney, Agent, or Firm*—R. Craig Armstrong; Borden Ladner Gervais LLP

(57) ABSTRACT

A water de-salination and ice slush producing system separates potable water and brine from sea water in a reverse osmosis apparatus. A chiller tube produces ice slush from the sea water mixed with waste brine. The chiller tube has an outer housing and a first cylindrical wall, defining a first cooling space together with the outer housing. A first cooling conduit is inside the first cooling space, for circulating a coolant to cool down the first cylindrical wall. A second cylindrical wall defines an ice generating space together with the first cylindrical wall. An inside of the second cylindrical wall defines a second cooling space having a second cooling conduit, wherein coolant enters the second cooling space via a coolant inlet, is cooled by the second cooling conduit having a refrigerant circulated inside from a refrigerant inlet to a refrigerant outlet, so that the coolant in the second cooling space cools the second cylindrical wall, the coolant then being circulated through the first cooling conduit to cool the first cylindrical wall. A scraper is rotatable inside the ice generating space, to remove fresh ice crystals from both an inner surface of the first cylindrical wall and an outer surface of the second cylindrical wall and transfer the ice crystals to an outlet.

22 Claims, 16 Drawing Sheets

APPARATUS FOR PRODUCING POTABLE WATER AND SLUSH FROM SEA WATER OR BRINE

This application claims the benefit of provisional application No. 60/299,159, filed Jun. 20, 2001.

FIELD OF THE INVENTION

This invention relates mainly to an apparatus for producing potable water together with ice slush from sea-water or brine, for instance on board small fishing boats, and relates particularly to such equipment where salt water is crystallized in a continuous process.

BACKGROUND OF THE INVENTION

There are known methods of continuous liquid cooling to the freezing point already in use. Examples of such methods are found in U.S. Pat. Nos. 3,328,972 and 3,347,058. Generally, water is crystallized from a highly concentrated mixture. This is the basic method of making ice cream or producing frozen concentrated juices, for example.

In U.S. Pat. No. 4,557,159 and Canadian patent 1,208,027 the idea of water crystallization is applied to a low concentrate mixture, for example 3% of chlorides (salts) in water. Conventional methods of making ice commonly use a refrigeration process, wherein ice crystals are formed in a thick layer on an evaporator cooling wall from which they are constantly removed as, for example, flakes or chips. Auger type ice making machines and ice cream or high concentrated slush making machines commonly use this type of method. Other low concentrate mixtures methods, for example using sea water, form the fresh ice crystals inside the salt and water mixture rather than on the evaporator cooling wall(s). For example, two scouring blades and a cylindrical chamber having a diameter of about three inches and a scouring paddle rotation of about 350 rotation mer minute was found satisfactory to prevent ice crystal formation on the evaporator cooling wall(s). Thus, the time interval between the freezing temperature point of the brine and starting point of the ice crystallization (about one degree Celsius) could be carefully maintained to avoid evaporator "freeze up". A standard "flooded" refrigeration circuit is described, in which a chamber surrounded by a jacket to which a condensed refrigerant is constantly supplied from condenser. The refrigerant boils in the jacket. It should be noted that at the idle conditions when the refrigeration compressor does not operate, the refrigerant, for example "Freon-22", is expanded and the pressure inside the jacket reaches up to 160 pounds per square inch depending upon the outside temperature and evaporator insulation. A jacketed evaporator of more than 6 inches diameter having more than 15 pounds per square inch pressure is considered being a pressure vessel and must be manufactured and serviced as per ASME CODE. This increases the manufacturing costs and such an evaporator is not convenient to have on a small fishing boat.

FIG. 8 shows a phase diagram of the binary system water and "salt" and thus the relationship of the seawater concentration and the ice formation condition. The brine is mainly a water and NaCl mixture and is called as solute. The eutectic point D1 is a point where the three state conditions (phases) liquid, salt and ice exist side-by-side. It will be reached at the specific combination of temperature, concentration and pressure indicated. At a seawater or waste brine concentration of 2.8% salt, the liquid freezing point is about 29.3 degrees Fahrenheit (minus 1.5 degrees Centigrade, point B in FIG. 8). The process follows the line B-C1 when the temperature goes down, salt concentration increases and ice crystallization starts. Point C1 represents the following conditions: 4.0% salt concentration, 28.2 degrees Fahrenheit (minus 2.3 degrees Centigrade) and slush concentration by volume is 80/20 (80% brine to 20% ice crystals.

The phase transformation from liquid to solid (water to ice crystals) happens very suddenly. The brine or solute is cooled down below its freezing point B when the crystallization starts. The length of the time interval between the cooling and crystallization processes is critical and depends on many factors of the process, such as brine concentration, brine turbulence near the cooling surfaces, specific heat of coolant or refrigerant, overall heat transfer coefficient, and discharge rate of the slush that forms inside the evaporator. All these factors must be addressed and optimized to avoid "freeze-up" and to provide a high efficiency apparatus.

The known ice cream machines and juice concentration freezers commonly use a high concentrate liquid, solute, with a low freezing point and uses a high specific heat refrigerant inside the evaporator jacket. A thick layer of ice crystals forms on the evaporator walls, which are constantly scoured by a low speed auger. The high concentrate liquid having a low freezing point gives a wider range of operating conditions, to avoid "freeze-ups", and a powerful auger drive provides enough force to scrape the thick layer of ice from the walls to a discharge opening. This type of refrigeration equipment can not be applied to low concentrate liquids, such as 3% brine or seawater. It is not economically feasible because of the high power consumption, non-efficient for the resulting low yield slush production and, most importantly, low concentrated brine too easily freezes up inside the evaporator.

U.S. Pat. No. 4,551,159 and Canadian patent 1,208,027 make an attempt to modify the ice making process for low concentrate brine and increase the overall heat transfer coefficient and as a result the evaporator capacity. A 3% brine/seawater concentration is used, and a required high turbulence of the brine near the cooling surfaces of the evaporator is provided. The cold layer of the brine is removed from the cooling surfaces before the ice crystals forms on them. An efficient heat transfer process is achieved, when the liquid refrigerant boils up inside the evaporator jacket. Unfortunately, the high heat transfer condition too easily causes "freeze-up" problem when applied to 3% brine or seawater. In practice, this happens because of the fast cooling of the heat transfer surfaces. The ice crystal formation interval set at 1 degree between cooling and point of crystallization is a sensible parameter that requires special means to control and which is difficult to maintain, unless the salt concentration of the brine is increased to at least to 4% or a better regulated refrigeration system is used. The agitator rotation can partially solve the "freeze-up" problem: the shorter the interval between consecutive wiping of the cooling surfaces, the faster removal of the cold layer will be that makes it possible to avoid ice formation on the cooling surfaces. U.S. Pat. No. 4,551,159 provides the specific calculations and suggests that a scraper rotation of 350 rotations per minute for a 3" diameter evaporator is satisfactory to minimize "freeze-up" problems. This solution is not practical for a larger diameter evaporator, for example a 12" diameter evaporator, from a mechanical and structural point of view, because the linear velocity of the scrapers inside the evaporator increases up to 290 meters per second, for example in the case of a 12.5" diameter evaporator. Canadian patent 1,208,027 mentions 150 wipes per minute scraper rotation.

U.S. Pat. No. 4,936,102 describes a method and apparatus for cooling down fish on a fishing boat. This patent suggests the idea to use seawater as make-up fluid to make more then 3% concentrated solution to produce ice "slurry" and eliminate "freeze-up" problems. It is apparently not a very economical solution to have an additional salt storage and extra equipment and it is therefor not a practical solution for small fishing boats (usually low cost operations).

SUMMARY OF THE INVENTION

It is an object of the invention to improve on the existing ice slush production machines and provide a machine which facilitates the slush production from ordinary sea water by combining the slush production with desalination of the salt water, to also produce potable water, and utilizing the salt brine from the desalination process in the ice slush production.

In the invention, a water de-salination and ice slush producing system advantageously has the following components:

- a submersible pump, for pumping seawater from the sea through pre-filtration stage filters,
- a high-pressure pump, for transferring the seawater to at least one reverse osmosis membrane, where a separation of potable water and waste brine occurs,
- a potable water storage tank, to which the potable water is transported,
- a collecting tank, to which waste brine is transported, and
- a chiller tube, for producing ice slush from the sea water mixed with waste brine.

The chiller tube of the invention has:

- an outer housing,
- a first cylindrical wall, which together with the outer housing defines a first cooling space with a first cooling conduit for circulating a coolant to cool down the first cylindrical wall,
- a second cylindrical wall defining an ice generating space together with the first cylindrical wall, an inside of the second cylindrical wall defining a second cooling space having a second cooling conduit, wherein coolant enters the second cooling space via a coolant inlet, is cooled by the second cooling conduit having a refrigerant circulated inside from a refrigerant inlet to a refrigerant outlet, so that the coolant in the second cooling space cools the second cylindrical wall, and the coolant is then circulated through the first cooling conduit to cool the first cylindrical wall, and
- a scraper assembly rotatably arranged inside the ice generating space, the scraper being rotated by a power source to remove fresh ice crystals from both an inner surface of the first cylindrical wall and an outer surface of the second cylindrical wall and transfer the ice crystals to an outlet in fluid communication with the ice generating space.

The outlet is advantageously arranged on a top of the chiller tube.

The chiller tube further advantageously has a top cover and a bottom cover, the top cover and the bottom cover being sealingly attached to the first cylindrical wall and the second cylindrical wall.

The top cover and the bottom cover are also advantageously sealingly attached to the outer housing.

Advantageously, the scraper assembly has at least two support rings having outer and inner blades for scraping ice slush.

The blades are advantageously raked for moving an ice slush flow upward to the outlet, for instance by having raked wings attached.

Further, the blades are advantageously spring loaded towards the respective surface to be scraped by biassing means, for example compression springs that press the edge of each blade towards the surface to be scraped.

An impeller is advantageously utilized to further enhance the ice slush flow in the desired direction inside the tube. The impeller is attached to the scraper, for instance, and thus propelled by the same power supply as the scraper.

Advantageously, all components of the system are mounted on a common frame, and also within the common frame, to conserve space and provide a compact and protected unit that is easy to transport.

Further features will be described or will become apparent in the course of the detailed description which follows.

BRIEF DESCRIPTION OF THE DRAWINGS

The invention will now be described in greater detail, with reference to the accompanying drawings of the preferred embodiment, in which.

DETAILED DESCRIPTION

The apparatus according to the invention is designed to produce potable water and ice slush from seawater by the combined use of reverse osmosis and a refrigeration processes by utilizing waste brine from the reverse osmosis process to make low temperature, for instance minus 1.5 degrees Centigrade to 2.5 degrees Centigrade, ice slush by utilizing a double wall scraped ice slush tube 2 (chiller tube) that cools down the sea-water or waste brine below its freezing point and by pumping out ice slush to a collecting tank for collecting the ice slush. The ice crystals are separated from the water by gravity and a screen while water is returned back to the ice slush tube via a pump, to continue the cooling down process. The brine to slush converting process continues inside the collecting tank to reach the required mixture consisting of an approximately 50/50 mixture of ice crystals and brine or seawater.

The apparatus thus incorporates the reverse osmosis and refrigeration processes that complement each other and are used as one assembly advantageously held on one structural frame.

Figure 1:
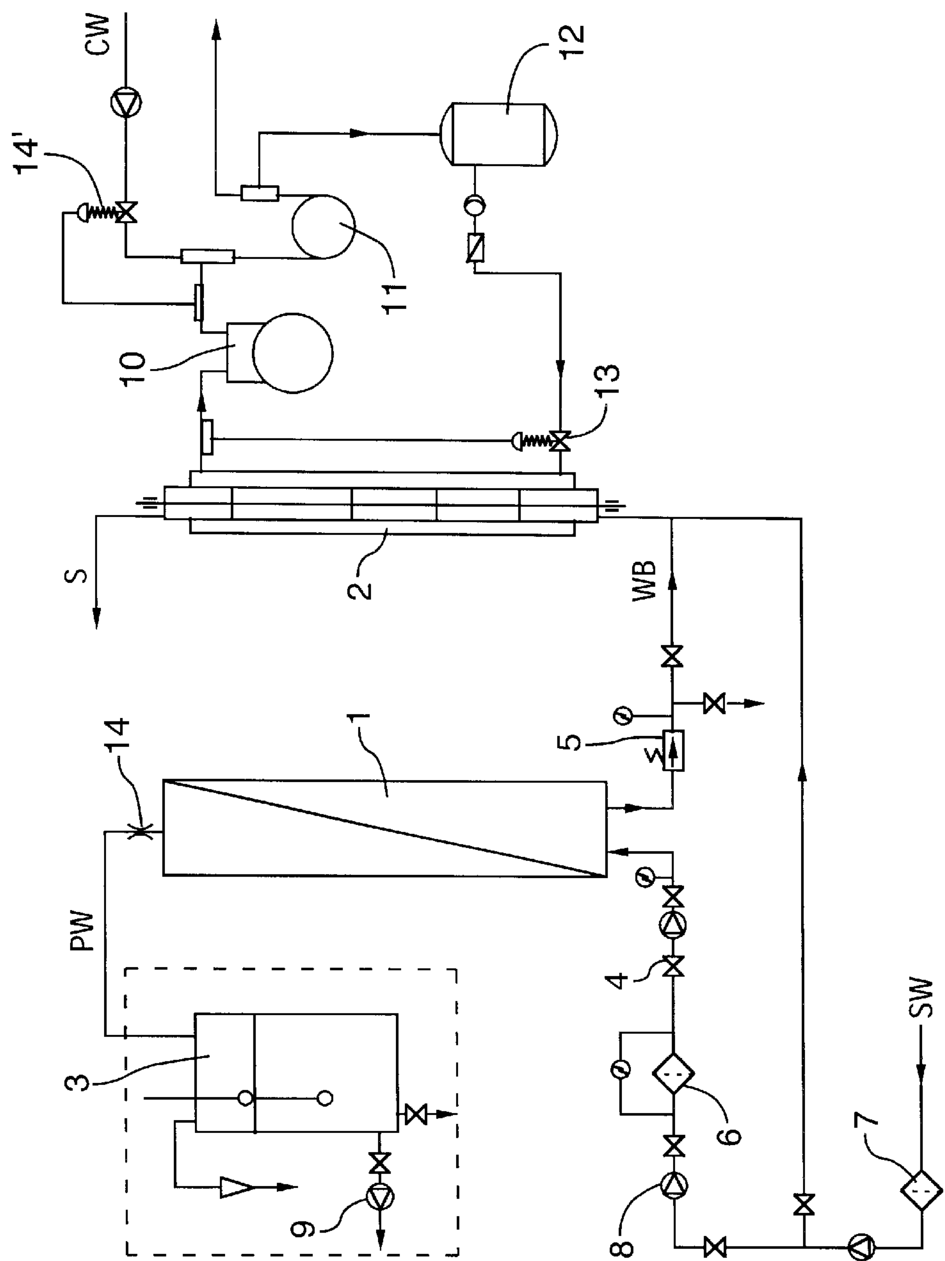
FIG. 1 is a schematic diagram of an apparatus according to one embodiment of the invention.
Figure 2A:
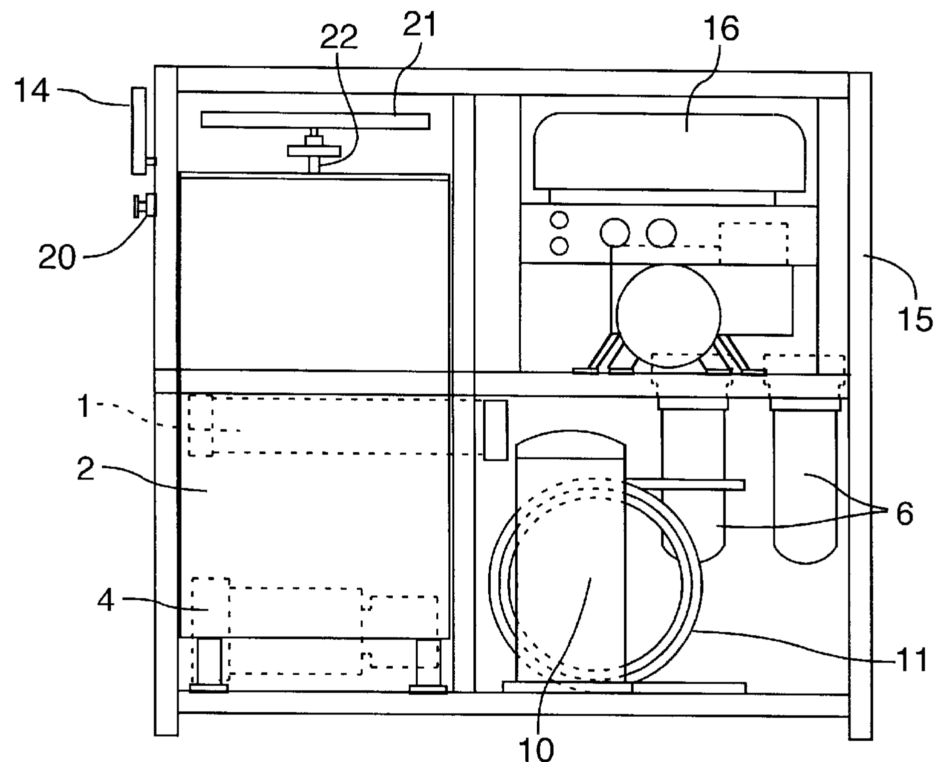
FIG. 2A is a plan side view of the apparatus according to one embodiment of the invention.
Figure 3A:
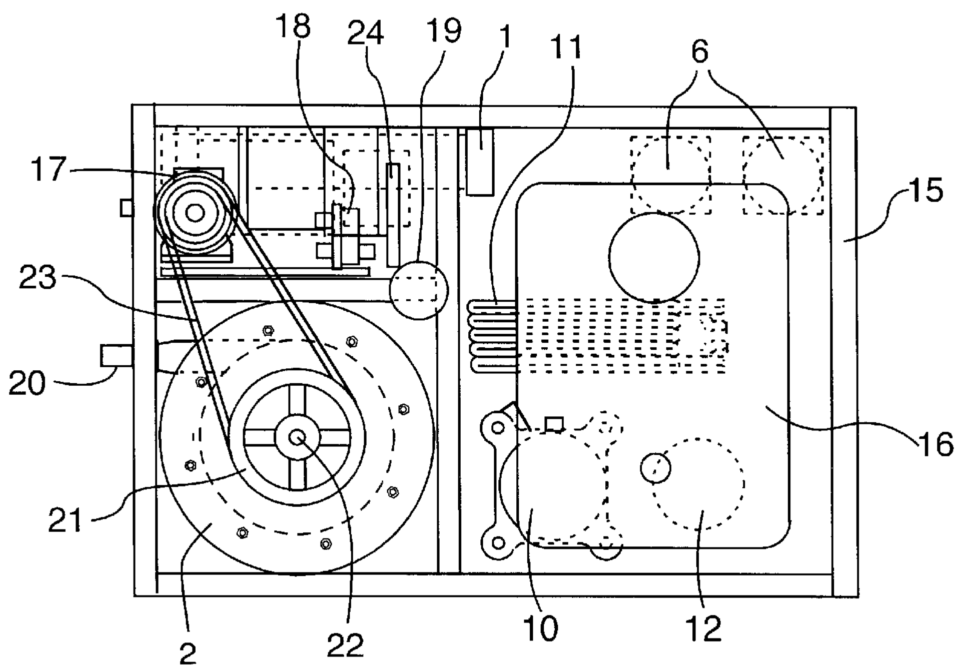
FIG. 3A is a plan top view of the apparatus of FIG. 2A.
Figure 2B:
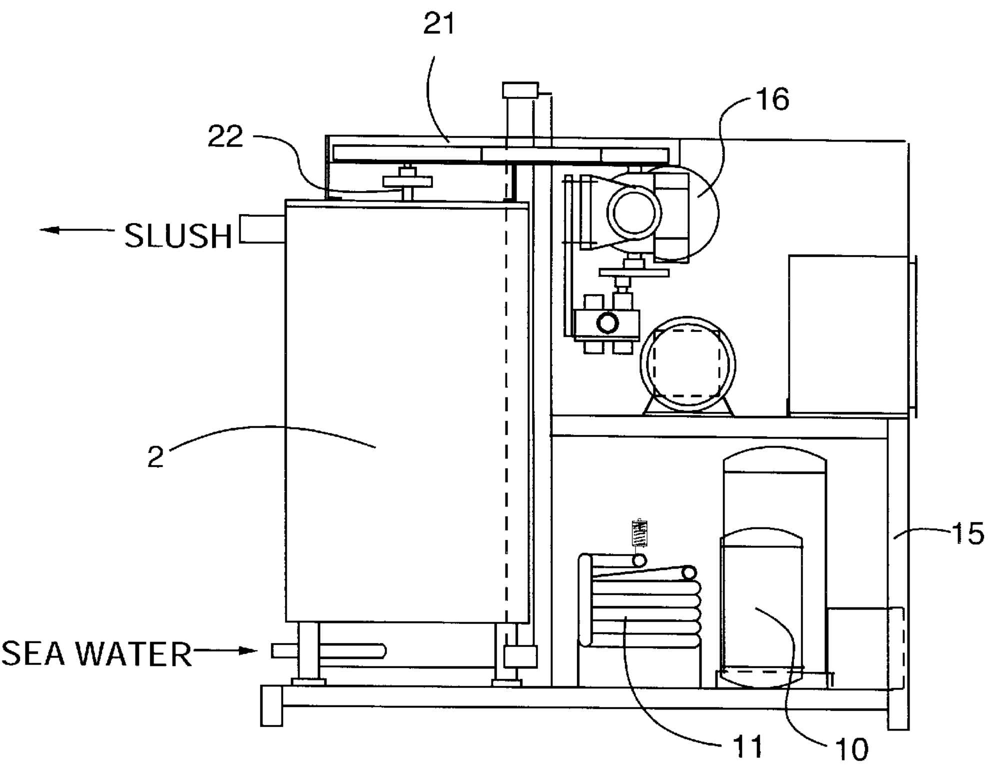
FIG. 2B is a plan side view of the apparatus according to a further embodiment of the invention.
Figure 3B:
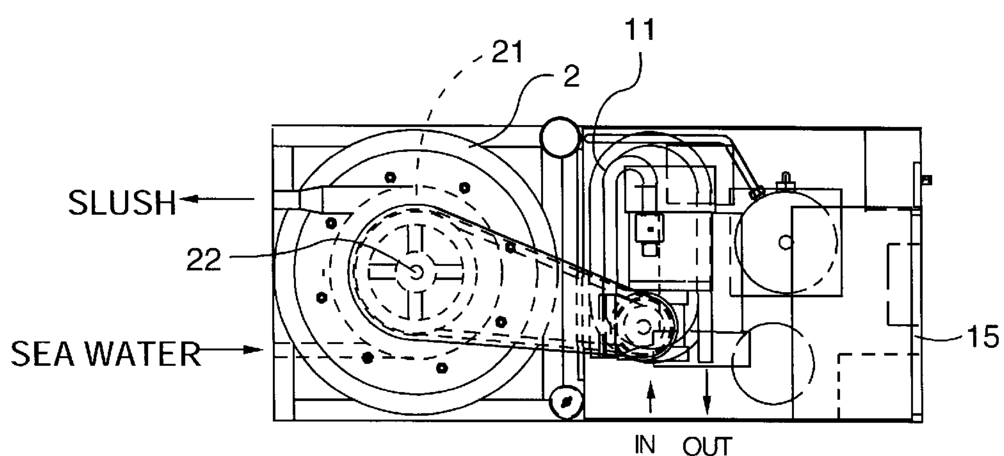
FIG. 3B is a plan top view of the apparatus of FIG. 2B.
Figure 4:
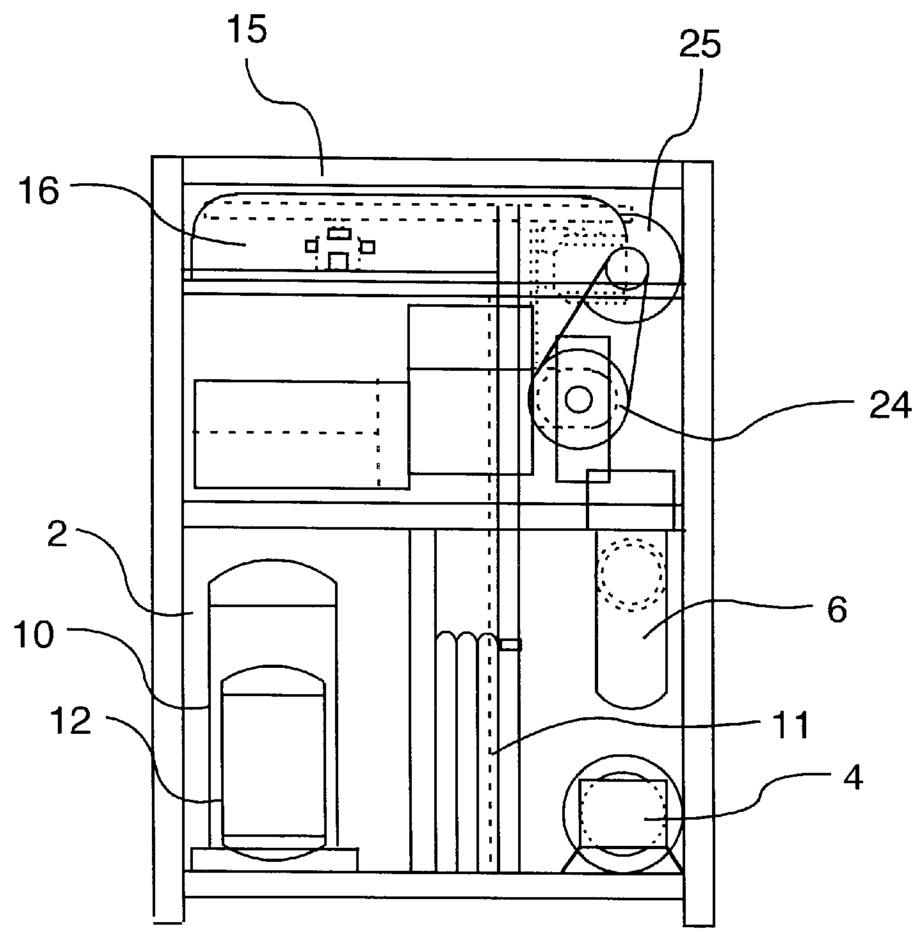
FIG. 4 is a plan end view of the apparatus of FIG. 2A.
Figure 5A:
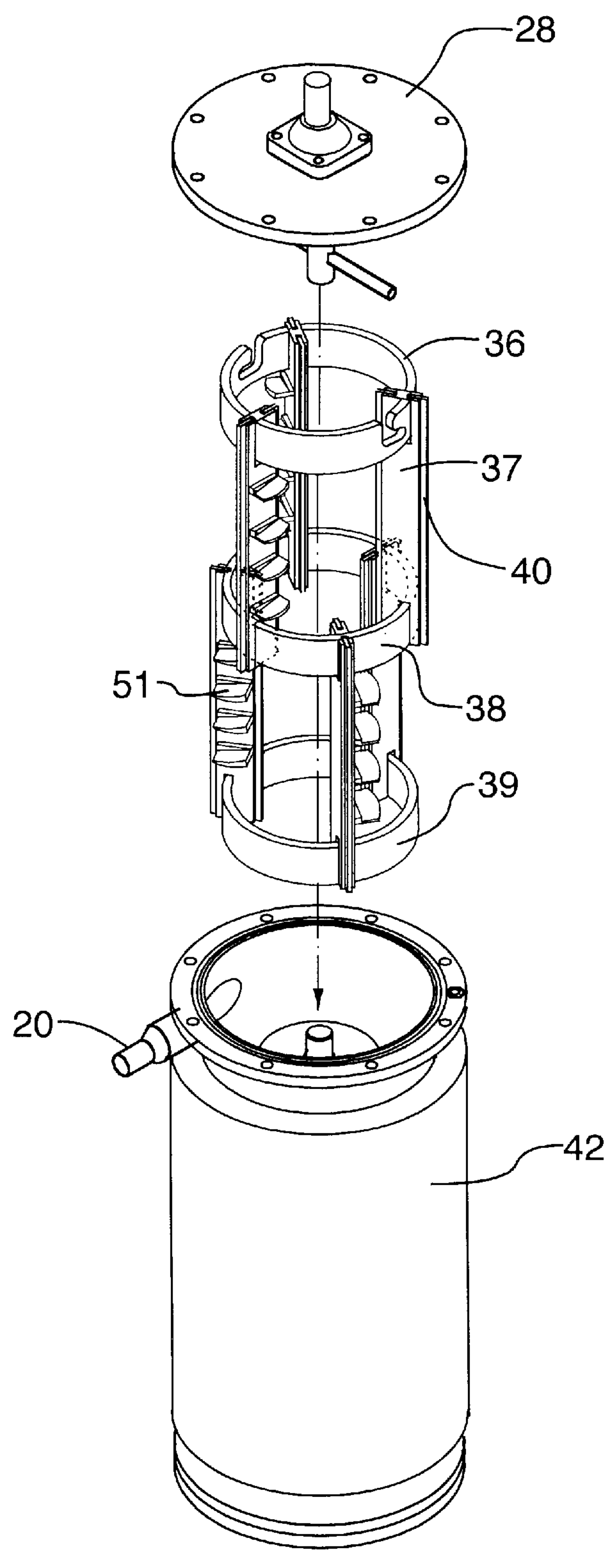
FIG. 5A is a partially exploded perspective view of a chiller according to one embodiment of the invention.
Figure 5B:
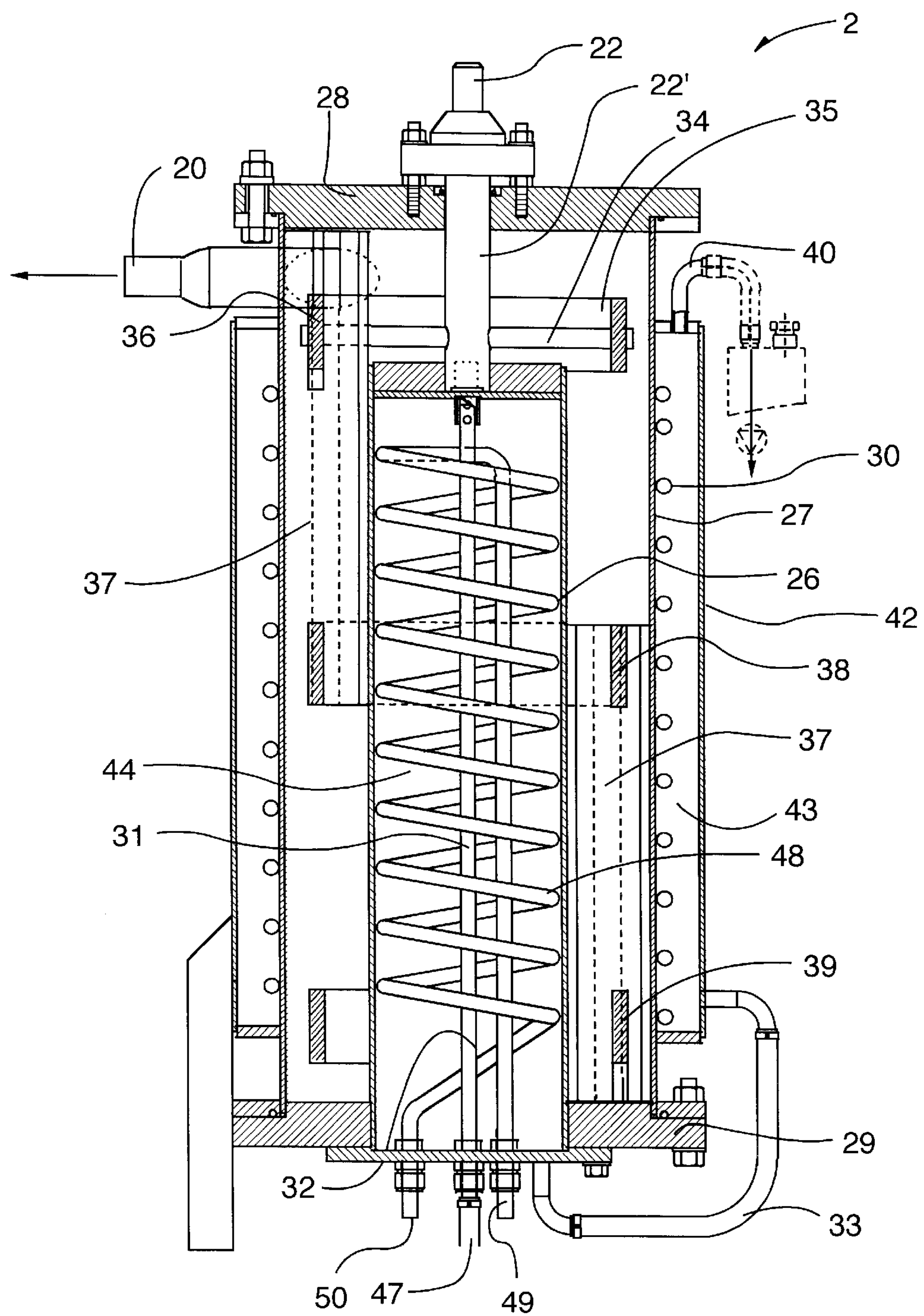
FIG. 5B is a partially sectioned side view of a chiller according to one embodiment of the invention.
Figure 6:
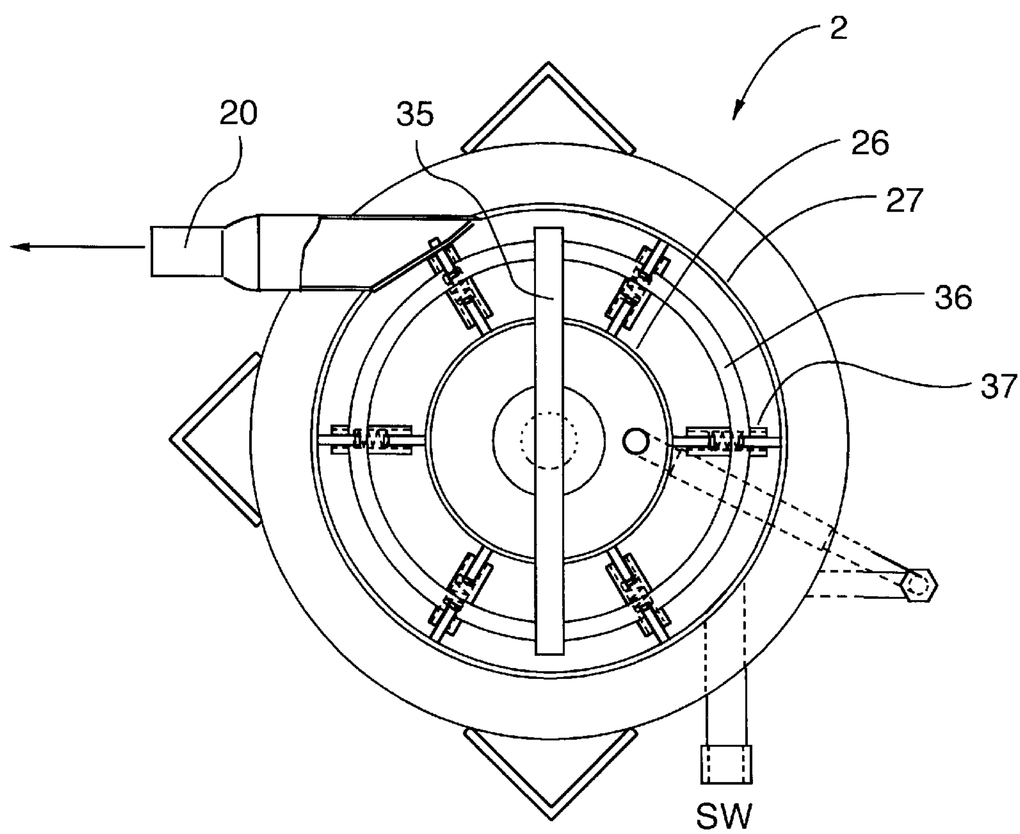
FIG. 6 is a partially sectioned top view of the chiller of FIG. 5B.
Figure 6A:
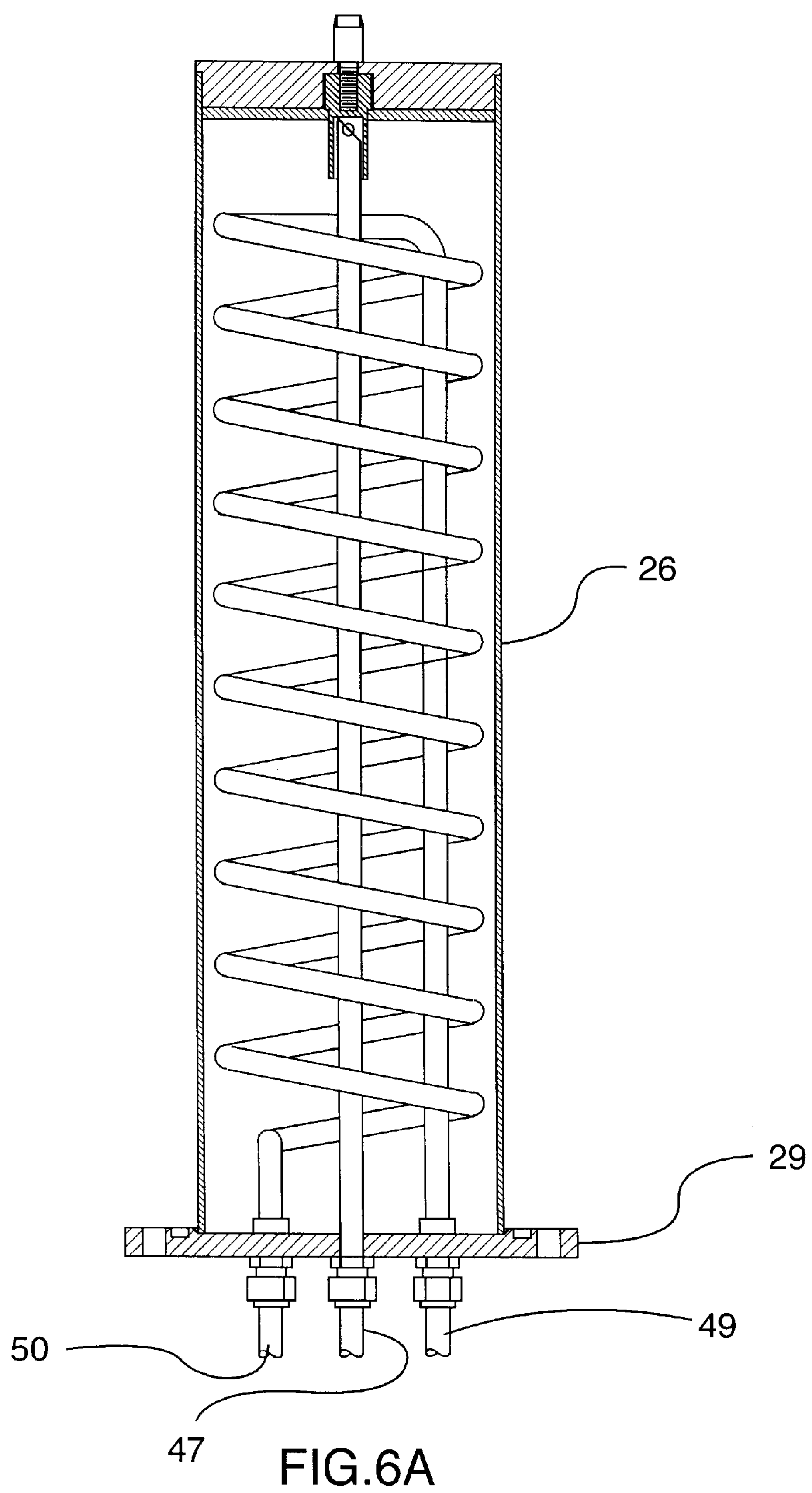
FIG. 6A is a sectioned side view of the inner cylinder of FIG. 5B.
Figure 6B:
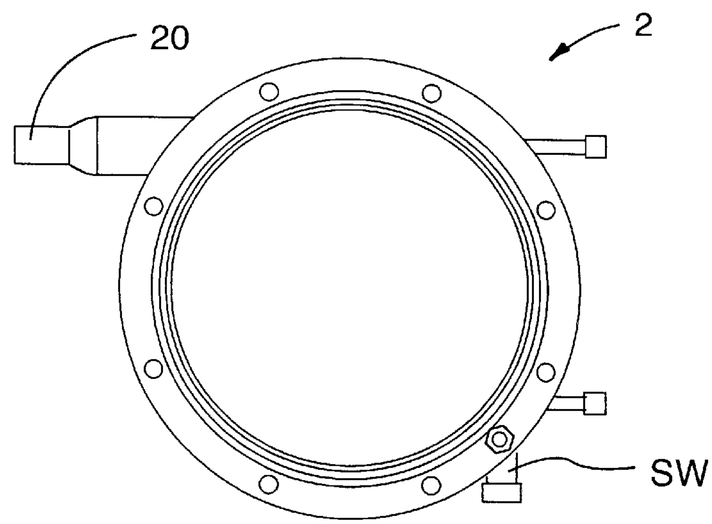
FIG. 6B is a top view of the chiller of FIG. 5B.
Figure 6C:
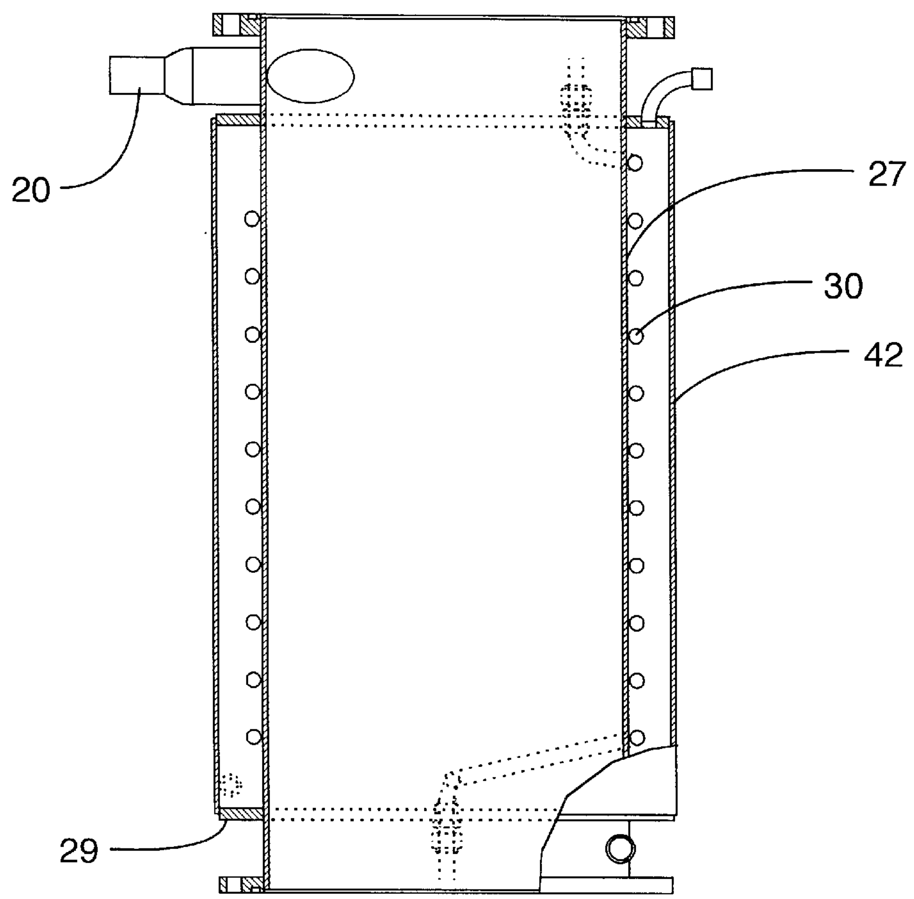
FIG. 6C is a sectioned side view of the chiller of FIG. 5B, having the inner cylinder, lid and scrapers removed.
Figure 6D:
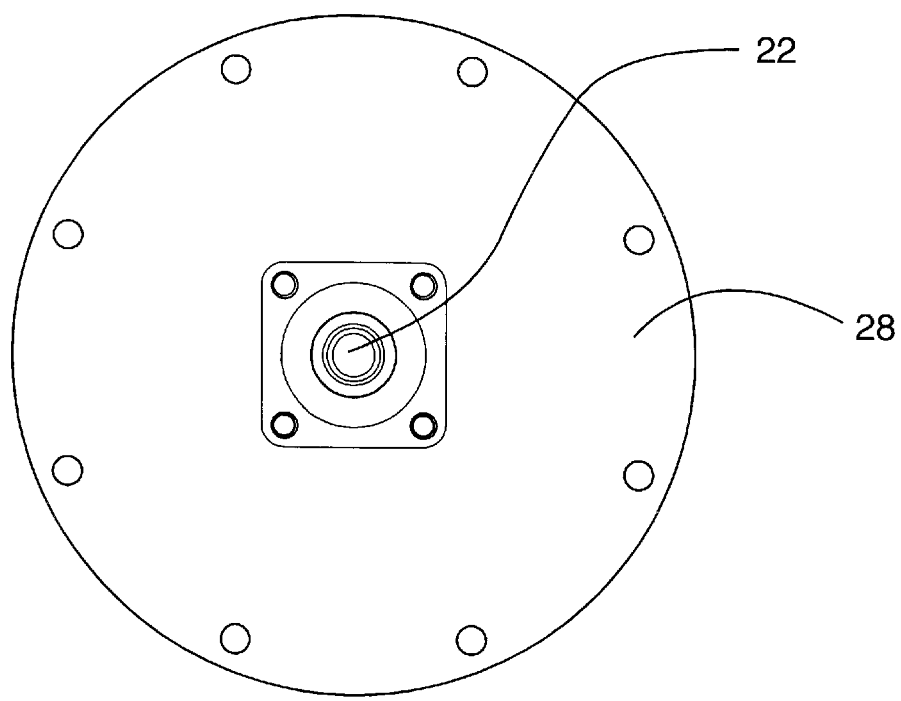
FIG. 6D is a top view of the chiller lid of FIG. 5B.
Figure 6E:
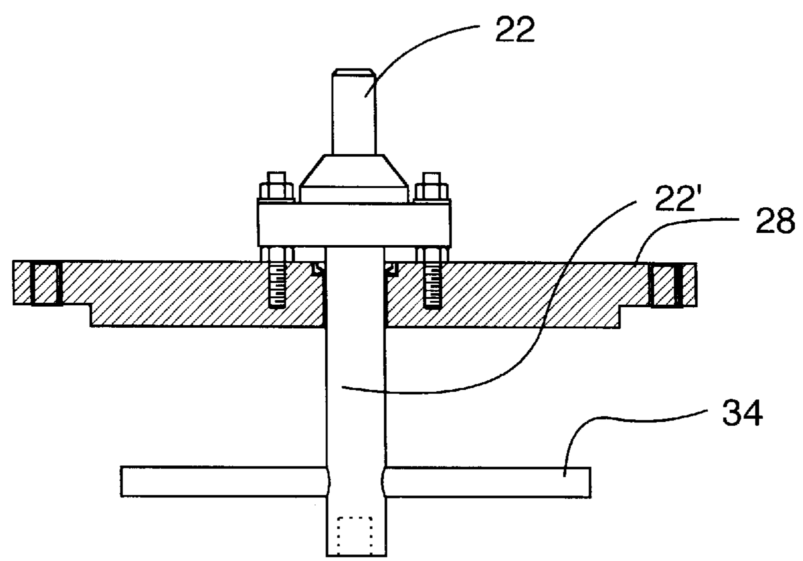
FIG. 6E is a sectioned side view of the chiller lid of FIG. 6D.
Figure 6F:
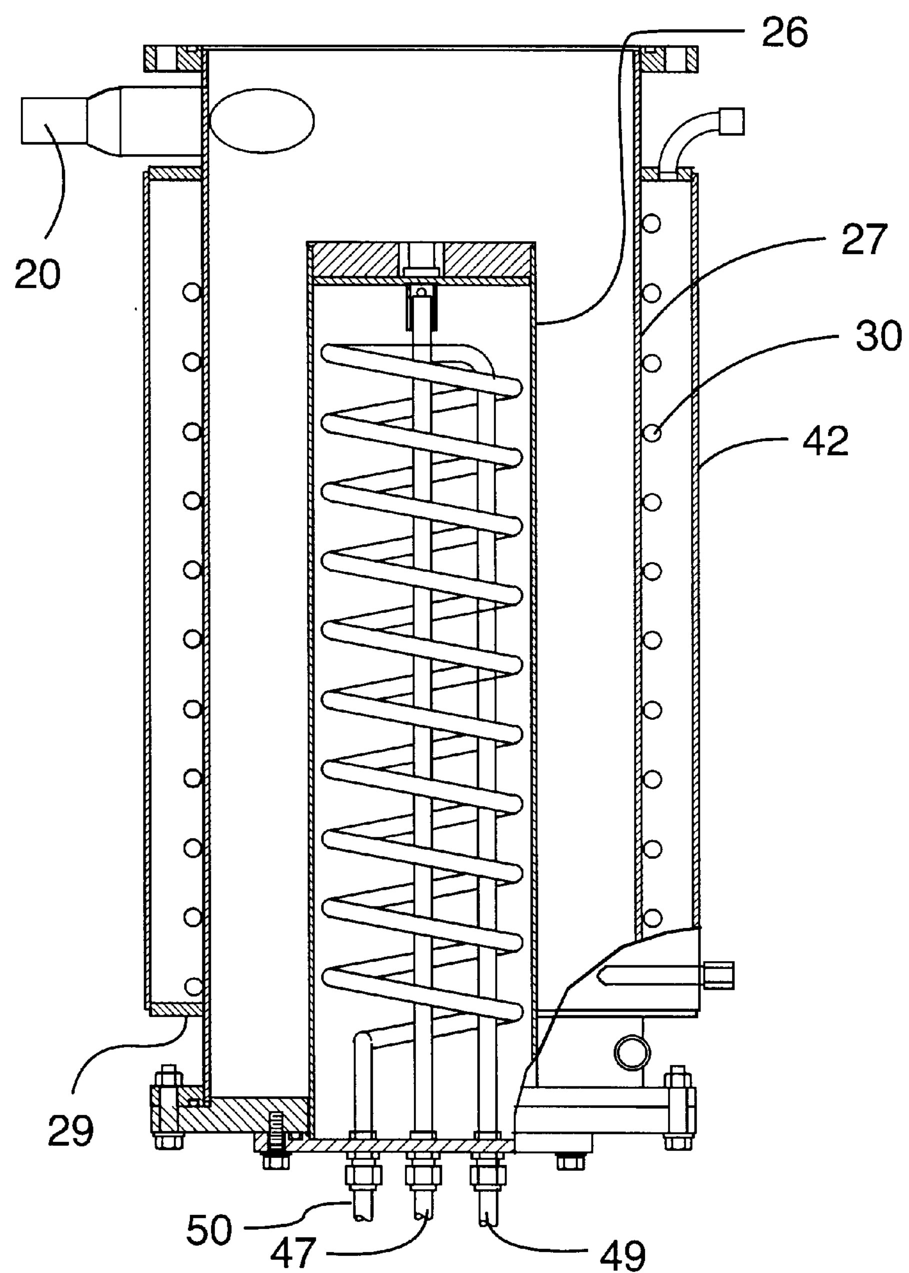
FIG. 6F is a sectioned side view of the chiller of FIG. 6C, having the inner cylinder installed, but lid and scrapers removed.
Figure 7:
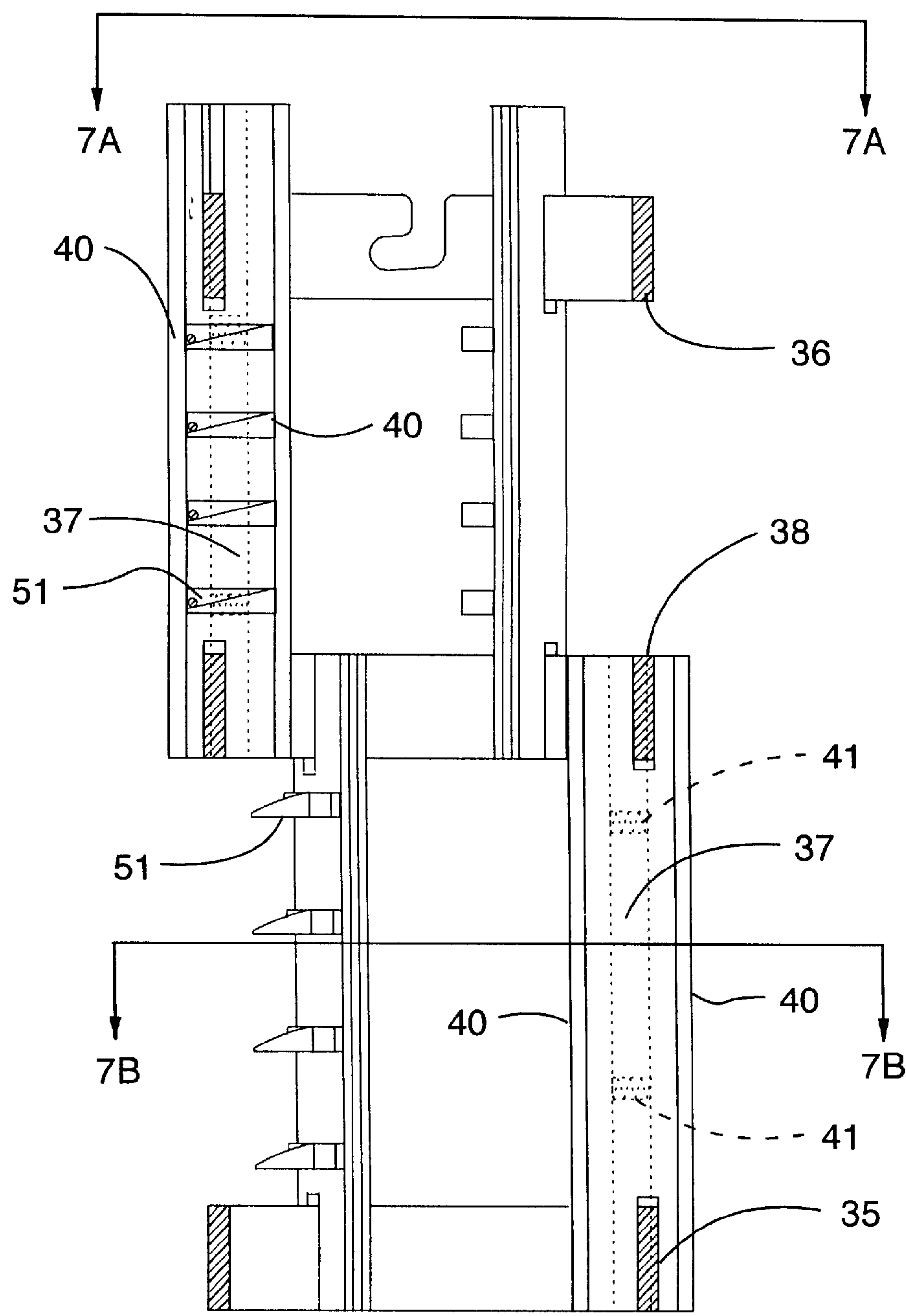
FIG. 7 is a partially sectioned side view of a scraper arrangement according to one embodiment of the invention.
Figure 7A:
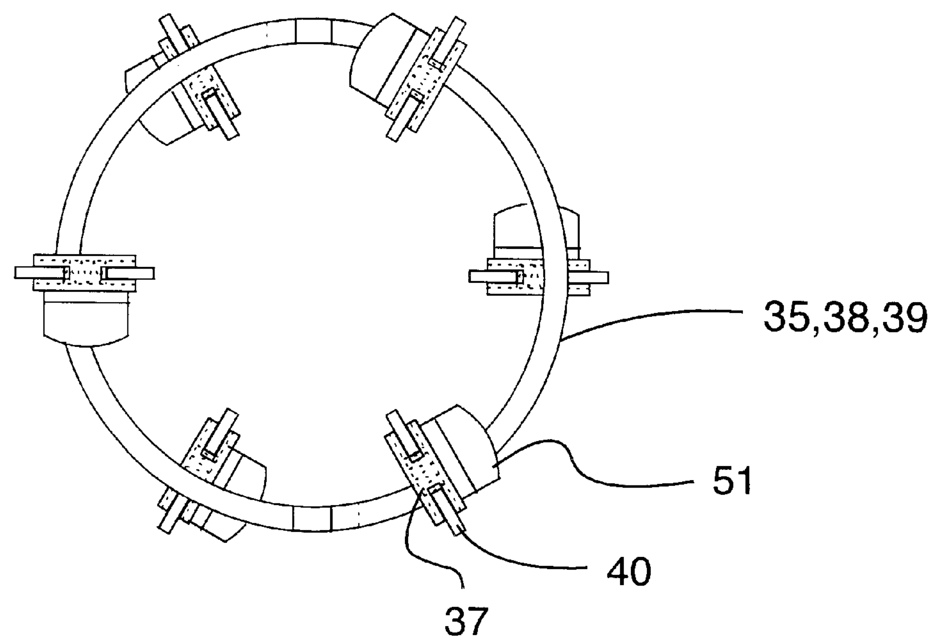
FIG. 7A is a top view of a scraper arrangement according to one embodiment of the invention, showing six scrapers.
Figure 7B:
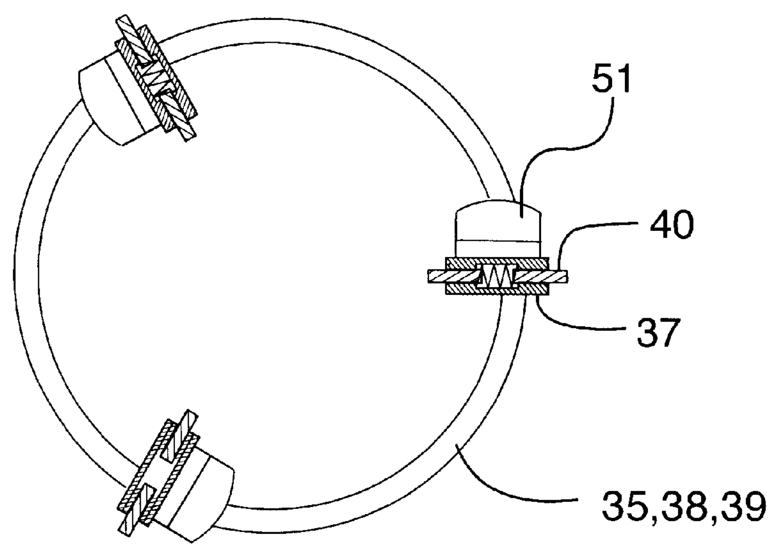
FIG. 7B is a top view of a scraper arrangement according to a further embodiment of the invention, showing three scrapers.
Figures 7C, 7D:
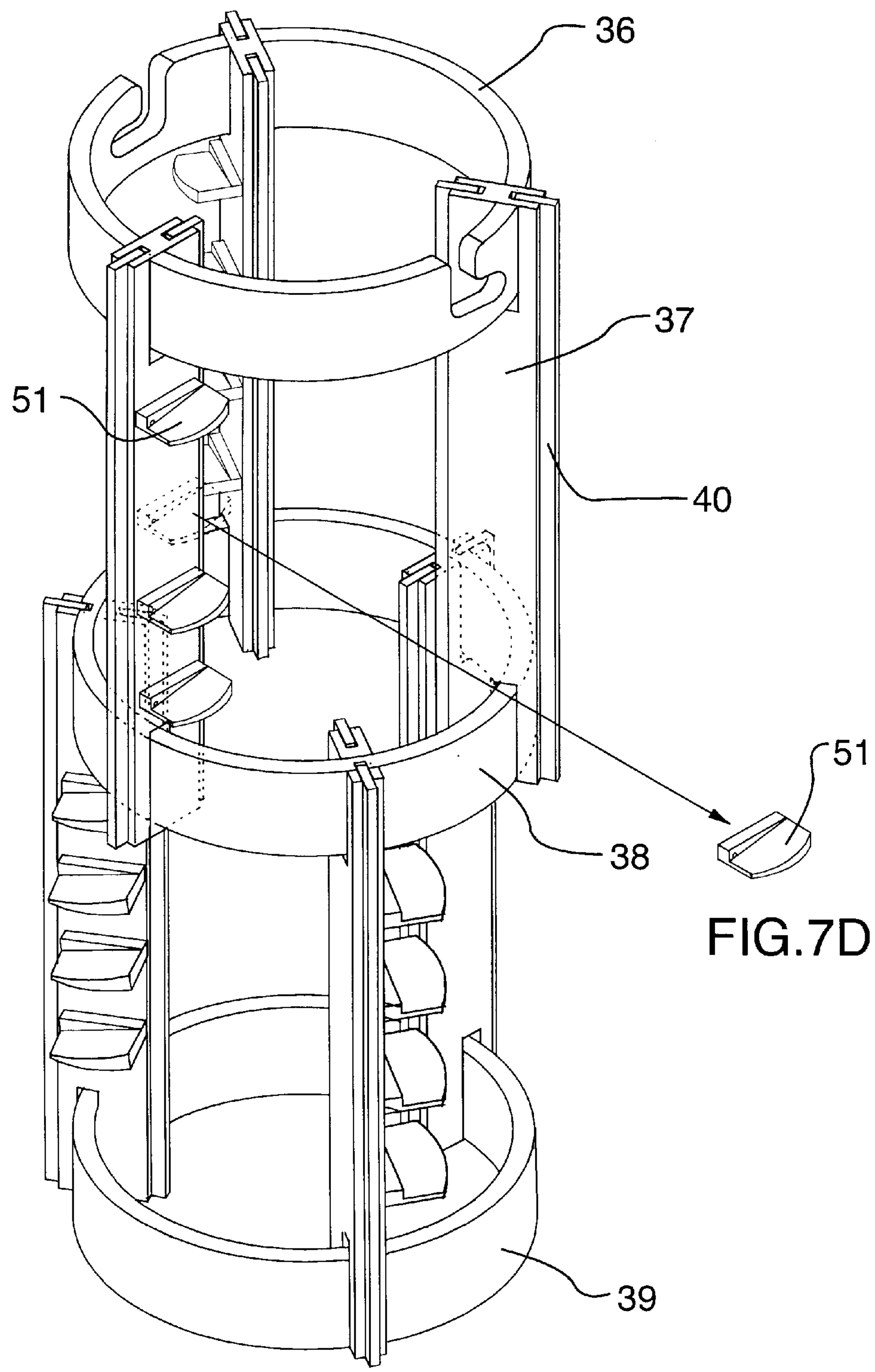
FIG. 7C is a perspective view of a scraper arrangement according to one embodiment of the invention, showing vanes attached to the scrapers.
FIG. 7D is a perspective detail view of a vane of FIG. 7C.
Figure 8:
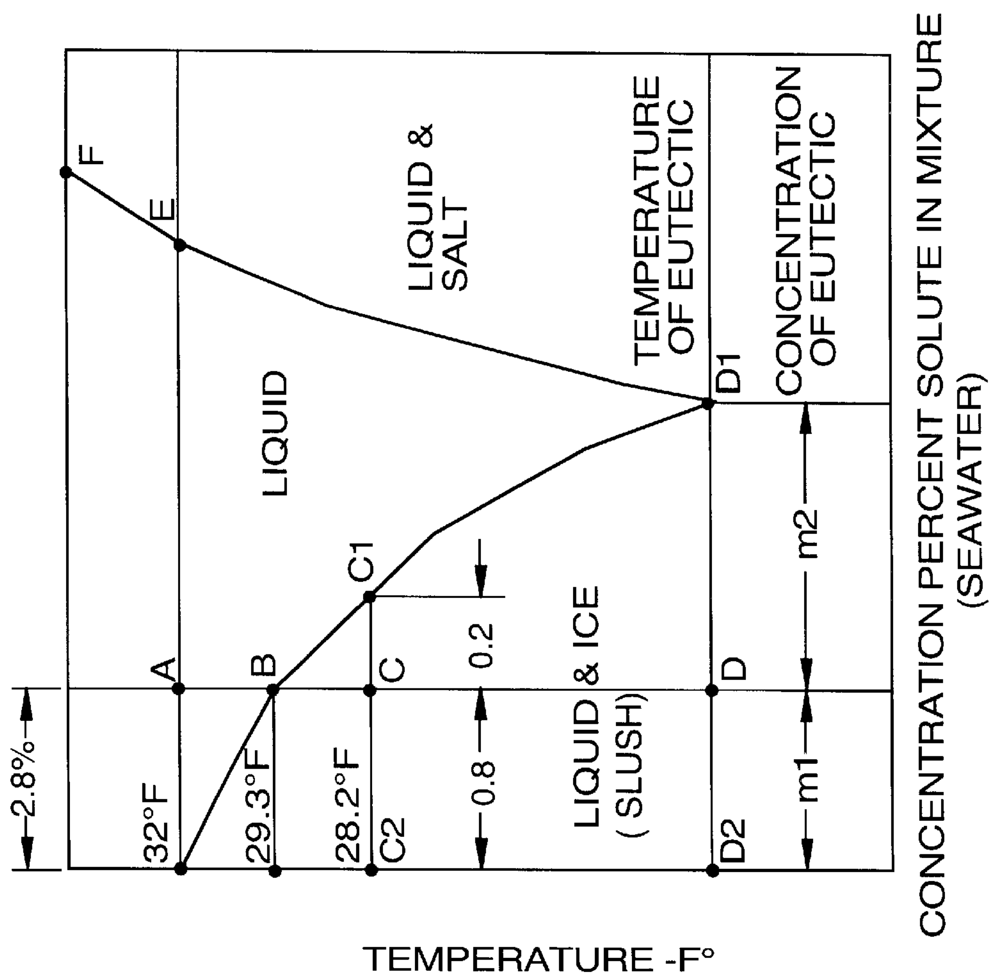
FIG. 8 is a phase diagram for the binary system water and "salt", mainly NaCl.
Figure 9:
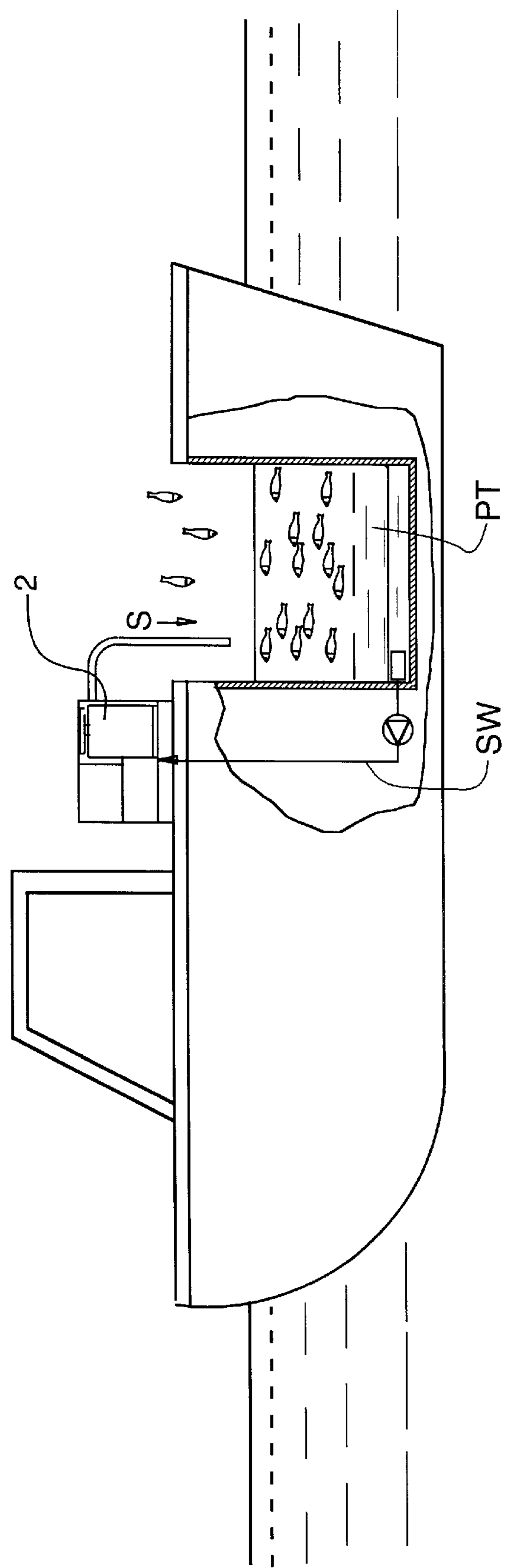
FIG. 9 is a schematic side view of a fishing boat equipped with an ice slush apparatus according to one embodiment of the invention.

The general process diagram is shown in FIG. 1. Seawater SW is pumped from the sea by a submersible pump 8 through the pre-filtration stage filters 6, and enters a high-pressure pump 4. The high-pressure pump transfers the seawater at a pressure about 800 pounds per square feet to at least one reverse osmosis membrane 1, where the separation of potable water PW and waste brine WB occurs. The potable water is transported to a potable water storage tank 3 and waste brine is transported to a collecting tank 12 or fish tank(s) FT (FIG. 9).

The process according to the invention includes the lowering of pumping energy consumption when waste brine WB from reverse osmosis process, at the controlled pressure between 30 to 80 pounds per square feet, is transported through the refrigeration process (which will be described in detail later) and is cooled down using cooling water CW prior to entering the collecting tank 12 or fish tank(s) FT, thus saving energy when running the brine circulating pump.

Seawater SW enters the reverse osmosis membrane filter(s) 1 and is separated into two water flows: potable water PW that is transported to a storage tank 3, and concentrated waste brine WB that is transported to a fish tank FT or slush holding tank 12.

The process according to the invention has the advantage that, by using the waste brine typically containing from 4 to 4.5% of salt, a low temperature ice slush having a temperature from minus 1.5 degrees Centigrade to minus 2.5 degrees Centigrade is produced.

The double wall ice slush tube 2, (see FIGS. 2A to 6F), produces a low temperature ice slush that significantly prolongs ice storage life and consequently the fish storage time. The double wall tube has an outer housing 42 that together with a first cylindrical wall 27 defines a first cooling space 43 having a first cooling conduit 30 (advantageously a copper coil) to circulate a coolant to cool down the first cylindrical wall. The tube 2 further has a second cylindrical wall 26 that defines an ice generating space 46 together with the first cylindrical wall 27 (the space between the two walls). The inside of the second cylindrical wall defines a second cooling space 44 having a second cooling conduit 31. Coolant enters the second cooling space via a coolant inlet 47, is cooled by a separate cooling coil 48 having a refrigerant circulated inside from a refrigerant inlet 49 to a refrigerant outlet 50. The coolant in the second cooling space 44 thus cools the second cylindrical wall 26, and is then circulated through the first cooling conduit 30 to cool the first cylindrical wall 27.

A scraper assembly 45 is rotatably arranged inside the ice generating space 46, and advantageously propelled via a scraper drive shaft 22' having a first pulley 21 attached to an end portion 22 of the shaft. The first pulley is rotated by a power source 16 (FIGS. 2A to 4), for example an internal combustion engine, via a belt 23 and a second pulley 17. The scraper assembly removes fresh ice crystals from both an inner surface of the first cylindrical wall 27 and an outer surface of the second cylindrical wall 26, and transfers the ice crystals to an outlet 20 advantageously arranged on a top of the slush tube 2 and in fluid communication with the ice generating space 46. The scraper drive shaft 22' is advantageously held in at least one ball bearing (not shown). The slush tube 2 has a top cover (lid) 28 and a bottom cover 29, which are mechanically sealed against the first cylindrical wall 27, the second cylindrical wall 26 and possibly also the outer housing 42.

The scraper assembly 45 advantageously comprises a first support ring 36, a second support ring 38 and a third support ring 39 having outer and inner blades 40 for scraping ice from the surfaces of the chilled walls as described earlier. The blades 40 are fastened between the first support ring 36 and the second support ring 38, and between the second support ring and the third support ring 39. The blades advantageously have protruding raked wings (vanes) 51 for moving an ice slush flow upward to the outlet 20. The blades are furthermore advantageously biassed towards the respective surface to be scraped by biasing means 41, for example compression screw springs. An impeller 35 may be utilized to further enhance the ice slush flow in the desired direction. Advantageously, the impeller is attached to the scraper drive shaft 22', for instance via a torque transfer rod 34.

All components of the apparatus (slush tube, power source, control panel, reverse osmosis system, filters, pump etc.) are advantageously mounted on and also within a common frame 15.

The ice slush production method is based on the process that includes fresh ice crystals formation on the cooling surfaces, scraping the ice crystals from the cooling surfaces, mixing ice crystals with incoming brine or sea water and transfer of the mixture of the ice crystals and brine, slush, to the discharge opening(s).

The ice slush tube according to the invention has expanded cooling surfaces (two instead of one traditionally) to provide maximum heat transfer surfaces for ice crystal formation on them. The waste brine or sea water is pumped into the ice slush tube. The fresh ice crystals are formed on the cooling surfaces of the housings and continuously scraped from the surfaces and mixed with the incoming flow thus forming ice slush. The scraper 45 removes the ice crystals simultaneously from the cooling surfaces of the outside and inside of the slush tube 2, providing vigorous agitation and transfers the formed slush to the discharge opening(s). The heat transfer surfaces are thus kept clean, resulting in maintaining a high heat transfer coefficient during the ice crystal formation process.

The method of cooling the waste brine or seawater utilizes the standard industrial refrigeration components of a thermal expansion system commonly used in controlled air conditioning installations.

The ice slush tube is designed to provide maximum heat transfer surface area in the limited space available using a "housing in housing concept". The apparatus is designed to assure "freeze-up" free conditions during the ice crystal formation process. The waste brine or seawater is pumped through the ice generating space 46 and is constantly cooled by the coolant, which has higher specific heat transfer properties compared to the specific heat of Freon(s).

The controlled refrigerant capacity, coolant circulation inside the jacketed space of the housings, combined with the scraping and the circulating pump rates provide excellent heat transfer conditions for the ice crystal formation at typically 24 pounds per square foot per hour and heat transfer coefficients of typically 290 BTU's per hour per square foot per degree Farhrenheit.

Advantageously, a 12.5" diameter outer dimension of the first cylindrical wall 27 and a 6" inner diameter of the second cylindrical wall 26 and a total length of 30" for the slush tube 2 have been selected for testing and found working very well. The brine-circulating pump was set up at twelve gallon per minutes and scraper drive at seventy-four rotations per minutes was selected. The ice crystals started to form at the point when the coolant temperature inside the jacketed housing reached 4.5 degrees Fahrenheit. At a rated capacity of 36,000 BTU's and a cooling surface area of 8.11 square feet, the heat transfer coefficient was 295 BTU's per hour per square foot per degree Fahrenheit and a temperature difference of 15 degrees Fahrenheit.

The apparatus according to the invention uses an evaporator, which is supported by the refrigeration system selected to operate under controlled conditions. This system utilizes the thermo-expansion refrigeration circuit and secondary coolant (the coolant as described above, as opposed to the refrigerant used) that is circulated through the slush tube first and second cooling spaces. The selection of the secondary coolant is based on specific properties of the coolant and ice crystals formation. (Something seems to be missing here). The higher value of the coolant specific heat, for example 0.56 BTU/hr, sq. ft, degree F., in comparison with 0.23 BTU/hr, sq. ft, degree F. for Freon R-22 (Reg. TM), creates conditions where the ice crystals grow slower as the coolant releases less heat to advantageously form the ice crystals, thus reducing the risk for "freeze-ups". This approach allows a reduction in scraper rotation up to 74 rotations per minute for the 12.5" diameter tube and decreases the necessary capacity of the brine circulating pump to a range from 6 to 12 gallons per minute, resulting in an ice slush making capacity of 24 pounds per square foot per hour. The rate of the scraping frequency, about 148 wipes per minute advantageously, is selected based on the calculated cooling capacity to produce about 24 pounds per square foot per hour of brine. The dwell time of the ice crystals on the cooling surfaces of the evaporator is determined as follows: 60 (seconds in a minute)/148 (wipes per minute)=0.405 seconds per rotation.

The slush tube capacity is thus 24 pounds per square foot per hour or 0.0066 pounds per square foot per second when the ice crystal accumulation for the wipe's interval is 0.0066/0.405=0.0163 pounds per square foot. The ice crystal density at 28 degrees Fahrenheit is 57.3 pounds per cubic feet. The ice crystal accumulation on the walls is then 0.0163/57.3=0.00028 inches. In practice, it cannot be removed from the cooling surface because of the roughness of the evaporator surface and the scraper(s). The average roughness of the machined stainless steel surfaces are much larger than the size of the ice crystals accumulated during the scraping time interval. Even after honing the average roughness (peak-to-valley height) of the treated stainless steel surface is at a range from 32 to 4 microinches, 0.032 to 0.004 inches. This means that the ice crystals are formed inside the surface texture first and only after the crystals grow to a size larger than the surface roughness can they be removed from the surface by scraper. In practice, the speed of scraping the surfaces and related scraper rotation is not critical if the ice crystal size is not critical. In the invention, the double pass scraping starts removing ice crystals from the cooling surfaces when the ice crystal sizes are in a range between 0.005 and 0.01 inches. In any other case that have various scraper rotation speeds, the ice crystals are formed inside the surface texture and the ice crystals layer must be thick enough to be removed from the cooling surface and mixed with incoming brine to form the slush.

The brine circulates through the slush tube 2 and slush collecting tank 12 with the use of a circulating pump 4 (see FIG. 1). The scraper 45 and the pump provide turbulent conditions inside tube that help maintain high heat transfer conditions during the cooling process. The ice crystals form a soft layer on the cooling surfaces of the tube and are scraped by the scraper with the help of the spring loaded blades, advantageously made of plastic. The mixture of ice crystals and incoming brine (slush) is then transferred to the discharge opening with the help of the impeller and the circulating pump.

The slush may then enter the slush collecting tank 12 (FIG. 1), where ice crystals are separated from the brine by gravity and screen(s) and brine returns to the tube.

One of the unique features of the invention is that seawater warmed up in the condenser of the refrigeration system can be pumped through the reverse osmosis system at a temperature of 77 degrees Fahrenheit (optimum temperature for the reverse osmosis operation), thus saving energy and extra cost for an extra heater and pump.

The test results of the apparatus confirmed the projected potable water capacity, about 400 gallon per day and slush capacity about 24 pounds per square foot (of cooling area) per hour. The scraper rotation, scraping rates and waste brine or seawater pumping capacity were varied. Based on the test results the main parameters should be maintained and they are as follows: scraper rotation 74 rotation per minute, though it could be varied and reach 140 rotation per minute; the circulation pump capacity range could be between 6 to 12 gallons per minute.

The "housing in housing" concept of the invention saves space, minimizing the "footprint" of the apparatus, which is advantageous when installing the apparatus onboard a fishing boat, or similar. Various capacities of slush generation can be provided ranging from 2 tons per day to 12 tons per day using the same footprint of the frame 15, by varying the size of the slush tube 2, for instance by making tubes of different lengths and keeping the diameter constant. In this way, standard equipment scrapers etc. may be used for all applications.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. A water de-salination and ice slush producing system comprising:

a sea water intake;

a reverse osmosis means, where a separation of potable water and waste brine occurs, arranged to receive sea water from the sea water intake; and a chiller tube arranged to receive sea water mixed with waste brine, for producing ice slush, the chiller tube having:

an outer housing, a first cylindrical wall within the outer housing and spaced therefrom, which together with the outer housing defines a first cooling space with a first cooling conduit arranged to circulate a coolant in the first cooling space to cool down the first cylindrical wall, a second cylindrical wall arranged within the first cylindrical wall and defining an ice generating space together with the first cylindrical wall, an inside of the second cylindrical wall defining a second cooling space having a second cooling conduit, wherein coolant enters the second cooling space via a coolant inlet, is cooled by the second cooling conduit having a refrigerant circulated inside from a refrigerant inlet to a refrigerant outlet, so that the coolant in the second cooling space cools the second cylindrical wall, and the coolant is then circulated through the first cooling conduit to cool the first cylindrical wall, an ice outlet in fluid communication with the ice generating space;

a scraper assembly rotatably arranged inside the ice generating space, the scraper being rotated by a power source to remove fresh ice crystals from both an inner surface of the first cylindrical wall and an outer surface of the second cylindrical wall and transfer the ice crystals to the outlet.

2. The system as recited in claim 1, wherein the sea water intake means is a submersible pump, for pumping seawater from the sea through pre-filtration stage filters.

3. The system as recited in claim 1, wherein the reverse osmosis means has a high-pressure pump that transfers the seawater to at least one reverse osmosis membrane.

4. The system as recited in claim 1, wherein the outlet is arranged on a top of the chiller tube.

5. The system as recited in claim 1, wherein the chiller tube has a top cover and a bottom cover, the top cover and the bottom cover being sealingly attached to the first cylindrical wall and the second cylindrical wall.

6. The system as recited in claim 5, wherein the top cover and the bottom cover are sealingly attached to the outer housing.

7. The system as recited in claim 1, wherein the scraper assembly has at least two support rings having outer and inner blades for scraping ice slush.

8. The system as recited in claim 1, wherein the blades are raked for moving an ice slush flow upward to the outlet.

9. The system as recited in claim 1, wherein the blades are spring loaded towards the respective surface to be scraped by biassing means.

10. The system as recited in claim 1, wherein an impeller is utilized to further enhance the ice slush flow in the desired direction inside the tube.

11. The system as recited in claim 10, wherein the impeller is attached to the scraper.

12. The system as recited in claim 1, wherein all components of the system are mounted on a common frame.

13. The system as recited in claim 12, wherein all components of the system are mounted within the common frame.

14. A chiller tube, for producing ice slush, the tube comprising:

an outer housing, a first cylindrical wall, which together with the outer housing defines a first cooling space with a first cooling conduit for circulating a coolant to cool down the first cylindrical wall, a second cylindrical wall defining an ice generating space together with the first cylindrical wall, an inside of the second cylindrical wall defining a second cooling space having a second cooling conduit, wherein coolant enters the second cooling space via a coolant inlet, is cooled by the second cooling conduit having a refrigerant circulated inside from a refrigerant inlet to a refrigerant outlet, so that the coolant in the second cooling space cools the second cylindrical wall, and the coolant is then circulated through the first cooling conduit to cool the first cylindrical wall, a scraper assembly rotatably arranged inside the ice generating space, the scraper being rotated by a power source to remove fresh ice crystals from both an inner surface of the first cylindrical wall and an outer surface of the second cylindrical wall and transfer the ice crystals to an outlet in fluid communication with the ice generating space.

15. The chiller tube as recited in claim 14, wherein the outlet is arranged on a top of the chiller tube.

16. The chiller tube as recited in claim 14, wherein the chiller tube has a top cover and a bottom cover, the top cover and the bottom cover being sealingly attached to the first cylindrical wall and the second cylindrical wall.

17. The chiller tube as recited in claim 16, wherein the top cover and the bottom cover are sealingly attached to the outer housing.

18. The chiller tube as recited in claim 14, wherein the scraper assembly has at least two support rings having outer and inner blades for scraping ice slush.

19. The chiller tube as recited in claim 14, wherein the blades are raked for moving an ice slush flow upward to the outlet.

20. The chiller tube as recited in claim 14, wherein the blades are spring loaded towards the respective surface to be scraped by biassing means.

21. The chiller tube as recited in claim 14, wherein an impeller is utilized to further enhance the ice slush flow in the desired direction inside the tube.

22. The chiller tube as recited in claim 21, wherein the impeller is attached to the scraper.

* * * * *